United States Patent [19]
Roberts

[11] Patent Number: 6,078,125
[45] Date of Patent: Jun. 20, 2000

[54] ULTRASONIC APPARATUS

[75] Inventor: Allan J. Roberts, Poughquag, N.Y.

[73] Assignee: Branson Ultrasonics Corp., Danbury, Conn.

[21] Appl. No.: 08/898,625

[22] Filed: Jul. 22, 1997

[51] Int. Cl.$^7$ .................................................. H01L 41/08
[52] U.S. Cl. ..................... 310/325; 228/1.1; 310/323.18; 310/323.19
[58] Field of Search ...................... 310/323, 369, 310/322, 330, 333, 325, 26, 323.01, 323.18, 323.19; 228/1.1, 45; 156/73.1

[56] References Cited

U.S. PATENT DOCUMENTS

| | | | |
|---|---|---|---|
| 2,946,119 | 7/1960 | Jones et al. | 228/110.1 |
| 3,752,380 | 8/1973 | Shoh | 228/1 |
| 4,326,903 | 4/1982 | Summo | 156/73.1 |
| 5,096,532 | 3/1992 | Neuwirth et al. | 228/1.1 X |
| 5,603,444 | 2/1997 | Sato | 228/1.1 |

*Primary Examiner*—Mark O. Budd
*Attorney, Agent, or Firm*—Polster, Lieder, Woodruff & Lucchesi L.C.

[57] ABSTRACT

An ultrasonic apparatus useable for welding metal by vibrations in the ultrasonic frequency range, employs a horn dimensioned to be resonant as a full wavelength resonator for vibrations of a predetermined frequency traveling longitudinally therethrough. To increase the energy available, the horn is coupled to a pair of transducers, one transducer coupled to each of the radially disposed end surfaces of the horn. During operation, one transducer must be in its longitudinal expansion mode when the other transducer is in its longitudinal contraction mode and vice versa. In order to accomplish this, two substantially identical transducers are used, but the orientation of the piezoelectric disc or discs in one of the transducers is reversed with respect to the orientation of the disc or discs in the other transducer.

6 Claims, 2 Drawing Sheets

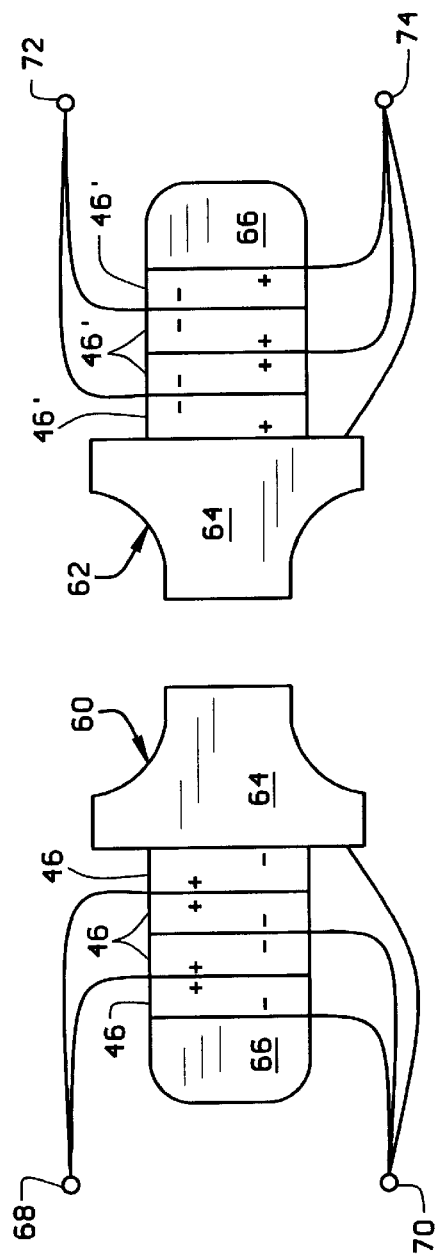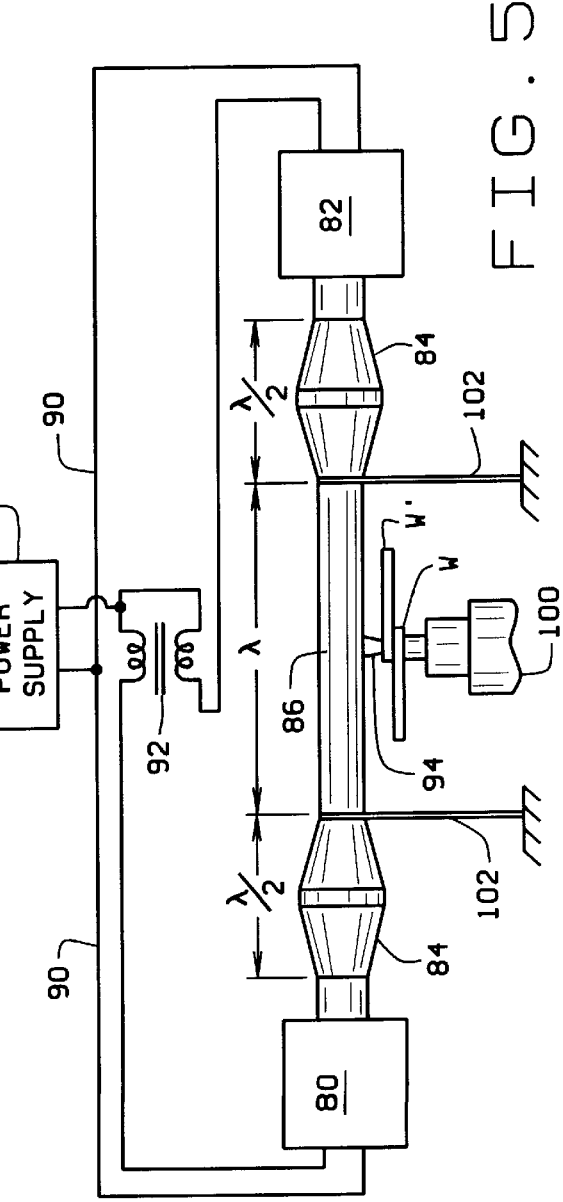

ULTRASONIC APPARATUS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to an ultrasonic apparatus and more particularly to an ultrasonic apparatus useful for welding metal by vibrations applied in a direction parallel to the workpiece surface, also known as shear wave vibrations. Quite specifically, this invention discloses an ultrasonic welding apparatus characterized by providing increased vibratory energy in order to enable improved welding of more difficult to weld metal workpieces, or for shortening the weld cycle as a result of the increased energy available from the apparatus.

BRIEF SUMMARY OF THE INVENTION

This invention refers to an ultrasonic welding apparatus comprising an elongate horn, also known as solid horn, resonator, sonotrode, etc., dimensioned to form a full wavelength resonator for vibrations of a predetermined frequency traveling longitudinally therethrough. The horn is coupled at its two radially disposed end surfaces, which are located at antinodal regions of the longitudinal motion of the horn, to a respective transducer, either directly or via a coupling horn, also known as booster horn. The transducers are energized electrically in parallel and in phase from a suitable alternating current source at the predetermined frequency. Importantly, the transducers are operated to cause one transducer to be in its longitudinal expansion mode when the other and opposite transducer is in its contraction mode and vice versa, in view of the fact that the end surfaces of the horn undergo reciprocating longitudinal motion in the same direction. A workpiece engaging surface disposed substantially at the third antinodal region of the horn, substantially medially between the end surfaces, is adapted to couple vibrations to a workpiece, the vibrations being of greater peak-to-peak amplitude than is achieved with a single transducer. In the preferred embodiment, the two transducers use piezolectric discs for converting electrical energy to mechanical motion and are of substantially identical construction, except the piezoelectric disc or discs in one transducer are oriented in a reversed manner, i.e. flipped over, with respect to the other transducer.

A principal object of this invention, therefore, is the provision of an improved ultrasonic welding apparatus for welding metal workpieces.

Another important object of this invention is the provision of an ultrasonic frequency welding apparatus for welding metallic workpieces characterized by providing increased welding power.

Another important object of this invention is the provision of a full wavelength horn which, when operative, is energized with ultrasonic frequency vibrations at each end.

A further important object of this invention is the provision of an ultrasonic apparatus comprising a full wavelength horn rendered resonant by a pair of transducers, one coupled to each of the end surfaces of the horn, and both transducers being electrically energized in parallel and in phase from a single power supply.

Further and still other important objects of this invention will be more clearly apparent from the following description when read in conjunction with the accompanying drawings.

BRIEF DESCRIPTION OF THE SEVERAL VIEWS OF THE DRAWING

FIGS. 4A and 4B are partial views of transducer assemblies used in the present invention, and FIG. 5 shows an embodiment of the ultrasonic apparatus forming the present invention.

DETAILED DESCRIPTION OF THE INVENTION

Figure 1:
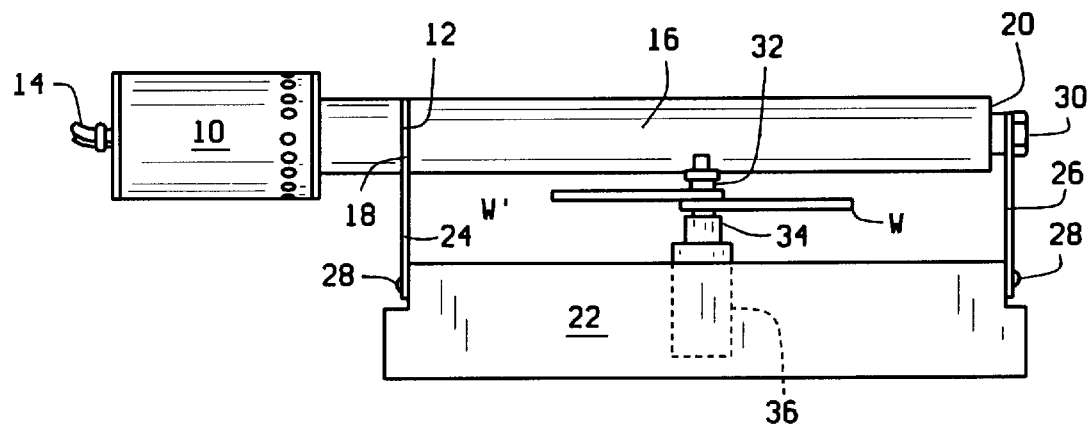
FIG. 1 is an elevational view showing a prior art ultrasonic apparatus useable for welding metal workpieces.
Figure 2:
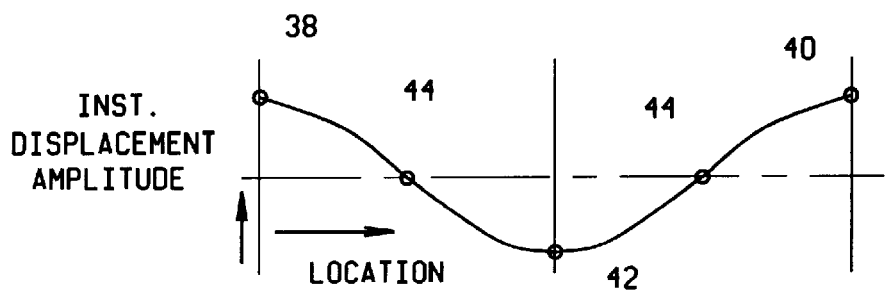
FIG. 2 is a graph showing instantaneous displacement amplitude vs. location when the horn shown in FIG. 1 is in its resonant condition.

With reference to the figures and FIGS. 1 and 2 in particular, there is shown a prior art ultrasonic welding apparatus described in detail in U.S. Pat. No. 3,752,380 "Vibratory Welding Apparatus", issued to A. Shoh, dated Aug. 14, 1973. Numeral 10 denotes an electroacoustic transducer which is adapted to receive alternating current electrical energy of a predetermined frequency via a conductor 14 and provides mechanical vibrations at that frequency at its radial output surface 12.

An elongate horn 16, dimensioned to be resonant as a full wavelength resonator for vibrations of that predetermined frequency traveling longitudinally through the horn between the two radially disposed end surfaces 18 and 20, is coupled to the transducer surface 12 for receiving the vibrations at its end surface 18. When the horn is resonant, the radial end surfaces 18 and 20 are located at respective antinodal regions of the longitudinal vibrations and these end surfaces, as a result of the horn 16 being a full wavelength resonator, reciprocate mechanically in phase with one another, that is, their mechanical vibratory motion is in the same direction. Typically, an ultrasonic frequency in the range between 15 kHz and 100 kHz is selected and most commercially available apparatus operate at a frequency around 20 kHz or 40 to 50 kHz.

The horn 16 and transducer 10, mechanically coupled to one another, are supported from a stationary base 22 by a set of support members 24 and 26, which at their lower end, are fastened by screw means 28 to the base. Support member 26 is secured at its upper end to the radial end surface 20 of the horn 16 by screw means 30. The construction of the support members 24 and 26, their ability to function as springs, yielding in the direction of the vibrations, but exhibiting rigidity in the direction normal to the vibrations, is explained and shown in the patent to Shoh, supra.

When rendered resonant, the horn 16 exhibits a further or third antinodal region located substantially medially between the antinodal regions at the end surfaces, and this further antinodal region is provided with a workpiece engaging surface 32. This workpiece engaging surface for welding is in forced engagement with the upper surface of a workpiece W', which is superposed on workpiece W, for instance, two pieces of sheet metal. The engagement force with the two workpieces W' and W is provided by a vertically movable anvil 34 coupled to a ram device 36.

When the horn is rendered resonant, the workpiece engaging surface 32 undergoes vibrations at the predetermined frequency along the longitudinal axis of the horn and couples vibrations in a plane along the workpiece surface into both workpieces to effect welding, see U.S. Pat. No. 2,946,119 issued to J. B. Jones et al., dated Jul. 26, 1960. Aside from metal welding, the apparatus may be used also for deforming thermoplastic material as shown in U.S. Pat. No. 4,326,903 issued to A. M. Summo, dated Apr. 27, 1982.

FIG. 2 is a graph showing the instantaneous vibratory amplitude of the resonant horn vs. location along the horn. Numerals 38 and 40 designate antinodal regions substantially coincident with the radial end surfaces 18 and 20 of the horn, and numeral 42 indicates the antinodal region substantially coincident with the workpiece engaging surface or tool 32. Numerals 44 indicate the nodal regions of the horn disposed between the antinodal regions.

It will be apparent that the mechanical power output from a single transducer is limited. In order to increase the power output at the workpiece engaging surface, the present invention discloses an arrangement wherein a transducer, also termed converter unit, is coupled to each end surface of the horn, see FIG. 5. Since the end surfaces of the horn, when resonant, move along the same longitudinal direction, in phase, it will be evident that the two transducers must operate mechanically 180 degrees out of phase, or more particularly, one transducer must be in its longitudinal expansion phase when the other transducer is in its longitudinal contraction phase and vice versa.

This operating condition can be accomplished in several ways. For instance, each transducer can be operated by a separate power supply, the electrical alternating current outputs of which are precisely 180 degrees out of phase with each other. To maintain such an operational mode is difficult. Another possibility comprises the use of a single power supply and using a 180 degree phase shifting circuit in the output to provide a first and a second output voltage 180 degrees phase shifted relative to one another. Again, this arrangement contributes to the complexity of the electrical circuit.

A far simpler solution is achieved by using a pair of piezoelectric transducers having one or more piezoelectric discs, and assembling one of the transducers in such a manner that the piezoelectric disc or discs present in one transducer are reversed with respect to the other transducer. It is possible then to energize both transducers in parallel and in phase from a single power supply and obtain a 180 degree out of phase motion manifest at the respective output surfaces 12, FIG. 1, of the transducers.

Figure 3:
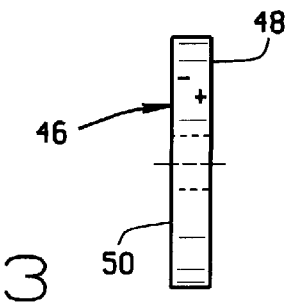
FIG. 3 is an elevationial view of a piezoelectric disc.

FIG. 3 illustrates a typical piezoelectric disc or wafer 46. The disc, when received from the manufacturer, is so polarized that when a positive voltage, for instance, is applied to the radial side 48 and a negative potential to the other side 50, the disc 46 contracts radially, thereby increasing its thickness, thus providing axial expansion. Conversely, when a negative potential is applied to the surface 48 and a positive potential is applied to the surface 50, the disc expands radially, causing a reduction of its thickness and, therefore, effecting a contraction along the axial direction. For the sake of the following description, the radial sides of the piezoelectric disc have been marked respectively with a plus and a minus identification mark. As an alternating voltage is applied across the disc sides, the disc alternatingly expands and contracts along its thickness, thus causing the horn to be subjected to the vibrations.

Referring now to FIGS. 4A and 4B, two substantially identical piezoelectric transducer assemblies 60 and 62 are shown in a somewhat schematic form. The construction of piezoelectric transducers, also known as converter units, is well known in the art and these devices are available from several manufacturers including the assignee of the present patent application. Each transducer comprises a stack of four piezoelectric discs 46 and 46', which are clamped between a respective front mass (front driver) 64 and rear mass (rear driver) 66 by a central bolt, not shown. Importantly, it should be noted that the piezoelectric discs 46', FIG. 4B, are oriented with their sides reversed, flipped over, with respect to the orientation of discs 46 of the transducer per FIG. 4A. This orientation is indicated by the plus and minus polarity signs in the figures.

As a result, when a positive voltage is applied at terminal 68 relative to terminal 70, the clamped assembly per FIG. 4A will expand longitudinally, while when a positive voltage is applied at terminal 72 relative to the terminal 74, the assembly per FIG. 4B will contract. When the voltage polarity is reversed, the reverse condition will prevail. Therefore, the transducers 60 and 62 can be coupled to the opposite end surfaces of a full wavelength horn in order to drive such a horn at is resonant state, in which condition the horn's end surfaces move in-phase in the same longitudinal direction, while the vibration mode of the transducers is 180 degrees out of phase with one another, i.e. one transducer is in the expansion mode when the other transducer is in the contraction mode.

FIG. 5 shows a preferred embodiment of the present invention, namely an ultrasonic apparatus useful for joining metallic workpieces by vibratory energy, or for deforming thermoplastic workpieces, the apparatus being characterized by providing increased vibratory energy. As seen in this figure, a transducer 80 is coupled via a coupling horn 84 to the left end surface of a full wavelength horn 86, while a second transducer 82 is coupled via a substantially identical coupling horn 84 to the right end surface of the horn 86. As explained in connection with FIGS. 4A and 4B, the transducers are substantially identical in construction, except that the orientation of the polarized piezoelectric disc or discs clamped between a respective front mass and rear mass in one transducer is reversed with respect to the other transducer, thus causing one transducer to undergo elongation when the other transducer undergoes contraction and vice versa, in an alternating manner responsive to both transducers being energized in parallel and in phase from an alternating current source 88. The source 88, also known as power supply or generator, provides at its output the voltage of the predetermined frequency at which the horn, the coupling horns and the transducers are resonant. Suitable conductors 90 couple the source 88 to the transducers, which are energized in parallel and in phase, A balancing transformer unit ("balun") 92 is connected serially in the electrical circuit between the source of alternating current and the transducers 80 and 82 in order to substantially inhibit the flow of circulating currents. Since the transducers are capacitive devices, a difference of the respective electrical capacitance and motional voltage tolerance could give rise to the existence of circulating currents flowing between the transducers.

Numeral 94 designates the workpiece engaging surface or tool disposed at the third antinodal region of the horn, providing during resonance of the horn, vibrations substantially parallel to the surface of superposed workpieces W' and W. The vibrations effect welding as stated above. The workpieces are urged into forced contact with the workpiece engaging surface of the horn by a movable anvil structure 100. A pair of support members 102 support the horn 86 from a fixed base, not shown, in a manner described in connection with FIG. 1.

It should be noted that the use of coupling horns is optional, but they are useful for increasing the mechanical gain of the horn. In a similar manner, the horn may be provided with a reduction in cross-sectional area for the same purpose, as is illustrated in the patent to Shoh, supra, FIG. 10. Increased mechanical gain results in an increase of the vibaratory excursion of the tool 94.

The above described transducer constructions, as will be observed, solves the problem of driving a full wavelength horn using a transducer coupled to each end of the horn in a most simple and economic manner, using a single power supply and requiring no phase shifting device.

While there has been described and illustrated a preferred embodiment of the invention, it will be apparent to those skilled in the art that various changes and modifications may be made therein without departing from the principle and spirit of this invention, which shall be limited only by the scope of the appended claims.

I claim:

1. An ultrasonic apparatus comprising:

an elongate horn dimensioned to be mechanically resonant as a full wavelength resonator for vibrations of predetermined frequency in the ultrasonic frequency range traveling longitudinally through the horn and when resonant exhibiting two radial end surfaces disposed at respective antinodal regions of said vibrations, said end surfaces moving reciprocatingly in phase in the longitudinal direction;

a pair of electroacoustic transducers, one transducer coupled to each of said end surfaces for coupling vibrations of said frequency to said horn responsive to said transducers being energized with alternating current at said frequency, and said transducers operating in a manner to cause their vibration mode to be substantially 180 degrees out of phase with one another when said transducers are energized in parallel and in phase, and a workpiece engaging surface disposed on said horn at a further antinodal region located substantially medially between said respective antinodal regions for coupling vibrations to a workpiece.

2. An ultrasonic apparatus as set forth in claim 1, each of said transducers including an assembly of at least one piezoelectric disc clamped between two masses, each of said discs when energized with alternating current causing during one half cycle of said current the respective assembly to expand longitudinally and during the following half cycle of said current to contract longitudinally, and said discs being oriented between their associated masses for causing alternatingly one assembly to expand while the other assembly contracts responsive to said discs being energized by said alternating current.

3. An ultrasonic apparatus as set forth in claim 2, each assembly comprising a plurality of piezoelectric discs, and the respective polarized radial side surfaces of the discs of one assembly being reversed in their orientation with respect to the side surfaces of the discs of the other assembly.

4. An ultrasonic apparatus as set forth in claim 2, and including a source for providing alternating current at said frequency, means coupling said alternating current to said transducers, and electrical current balancing means coupled serially in circuit between said source and each of said transducers for substantially inhibiting the flow of circulating currents between said transducers.

5. An ultrasonic apparatus as set forth in claim 1, and a coupling horn coupled between each of said transducers and a respective end surface of said horn.

6. An ultrasonic apparatus comprising:

an elongate horn dimensioned to be mechanically resonant as a full wavelength resonator for vibrations of a predetermined frequency in the ultrasonic frequency range traveling longitudinally through the horn, said horn when resonant exhibiting two radially disposed end surfaces disposed at respective antinodal regions of said vibrations;

a pair of coupling horns, one horn coupled to each respective end surface;

a pair of piezoelectric transducers, one coupled to each of said coupling horns for rendering said full wavelength horn resonant by providing, when energized with alternating current, vibrations of said frequency through said coupling horns to said full wavelength horn;

each of said transducers, when energized, undergoing alternatingly longitudinal expansion and contraction and said transducers being constructed to cause alternatingly one transducer to be in its expansion mode when the other transducer is in its contraction mode;

an alternating current power supply coupled to each of said transducers for energizing said transducers in parallel and in phase at said frequency;

a current balancer coupled in series between said power supply and said transducers for substantially inhibiting the flow of circulating currents between said transducers, and a workpiece engaging surface disposed on said full wavelength horn at a further antinodal region for coupling shear wave vibrations to a workpiece.

* * * * *